(12) United States Patent
Simakov et al.

(10) Patent No.: US 10,915,622 B2
(45) Date of Patent: Feb. 9, 2021

(54) DETECTING LOCAL USER SECURITY-RELATED ANOMALIES USING ACTIVE SCANS

(71) Applicant: MICROSOFT TECHNOLOGY LICENSING, LLC, Redmond, WA (US)

(72) Inventors: Marina Simakov, Ashdod (IL); Tal Be'ery, Petach Tikva (IL); Itai Grady Ashkenazy, Ramat Hasharon (IL); Chaim Menachem Hoch, Jerusalem (IL); Tal Joseph Maor, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 120 days.

(21) Appl. No.: 15/628,518

(22) Filed: Jun. 20, 2017

(65) Prior Publication Data
US 2018/0107820 A1    Apr. 19, 2018

Related U.S. Application Data

(60) Provisional application No. 62/409,558, filed on Oct. 18, 2016.

(51) Int. Cl.
*H04L 29/06* (2006.01)
*G06F 21/50* (2013.01)
*G06F 21/57* (2013.01)
*G06F 21/31* (2013.01)
*G06F 21/55* (2013.01)

(52) U.S. Cl.
CPC ............ *G06F 21/50* (2013.01); *G06F 21/316* (2013.01); *G06F 21/552* (2013.01); *G06F 21/577* (2013.01); *H04L 63/1433* (2013.01)

(58) Field of Classification Search
CPC ........................................................ G06F 21/50
USPC .......................................................... 726/26
See application file for complete search history.

(56) References Cited

U.S. PATENT DOCUMENTS

| | | | |
|---|---|---|---|
| 7,328,454 B2 | 2/2008 | Strickland et al. | |
| 7,549,168 B1 | 6/2009 | Magdych et al. | |
| 8,060,937 B2 * | 11/2011 | Carroll | H04L 63/104 |
| | | | 726/26 |
| 8,578,160 B2 | 11/2013 | Applin et al. | |
| 8,695,099 B2 | 4/2014 | Baikalov et al. | |

(Continued)

OTHER PUBLICATIONS

"Compare two folders with UltraCompare Professional", http://web.archive.org/web/20130215075524/http:/www.ultraedit.com/products/ultracompare/feature-map/compare_folders.html, Published on: Feb. 15, 2013, 4 pages.

(Continued)

*Primary Examiner* — Harris C Wang
(74) *Attorney, Agent, or Firm* — Workman Nydegger

(57) ABSTRACT

Embodiments are directed to monitoring local users' activity without installing an agent on a monitored machine. Periodic scans of the local users' directory using the standard protocol messages and APIs of a remote admin interface provide access to local machine data. Using the remote admin interface, defenders gain visibility to local users' logons, group membership, password changes, and other parameters. Security applications enabled by this visibility include, but are not limited to, abnormal logons detection, abnormal group addition and removal detection, and abnormal password changes detection.

20 Claims, 16 Drawing Sheets

(56) References Cited

U.S. PATENT DOCUMENTS

| | | | |
|---|---|---|---|
| 9,231,962 B1* | 1/2016 | Yen | G06F 21/552 |
| 9,407,652 B1* | 8/2016 | Kesin | H04L 67/22 |
| 2004/0068523 A1 | 4/2004 | Keith et al. | |
| 2012/0151565 A1* | 6/2012 | Fiterman | H04L 63/107 |
| | | | 726/7 |
| 2013/0254857 A1* | 9/2013 | Bajenov | H04L 63/083 |
| | | | 726/7 |
| 2015/0180894 A1* | 6/2015 | Sadovsky | H04L 67/22 |
| | | | 726/22 |
| 2015/0222765 A9 | 8/2015 | Kawach et al. | |
| 2015/0350238 A1* | 12/2015 | Dulkin | H04L 63/1433 |
| | | | 726/25 |
| 2016/0063116 A1 | 3/2016 | Abuelsaad et al. | |
| 2016/0088000 A1* | 3/2016 | Siva Kumar | H04L 63/10 |
| | | | 726/23 |
| 2016/0099960 A1* | 4/2016 | Gerritz | H04L 63/1433 |
| | | | 726/23 |
| 2016/0294863 A1* | 10/2016 | Dulkin | H04L 63/20 |
| 2016/0330220 A1* | 11/2016 | Dulkin | H04L 63/1408 |
| 2017/0054744 A1* | 2/2017 | Mumcuoglu | H04L 63/1441 |
| 2017/0318054 A1* | 11/2017 | Vissamsetty | H04L 63/1441 |
| 2018/0107820 A1* | 4/2018 | Simakov | G06F 21/577 |
| 2018/0218134 A1* | 8/2018 | Be'ery | H04L 63/1433 |

OTHER PUBLICATIONS

"Scan a remote folder", https://help.gnome.org/users/baobab/stable/scan-remote.html.en, Published on: 2005, 1 page.

* cited by examiner

```
PS C:\Users\user1.TESTDOMAIN.000> Get-NetLocalGroup -ComputerName
"client2" -GroupName "Guests"

ComputerName : client2
AccountName  : TESTDOMAIN/client2/Guest
SID          : S-1-5-21-4738845342-2774817237-2297341088-501
Description  : Built-in account for guest access to the computer/
               domain
Disabled     : True
IsGroup      : False
IsDomain     : False
LastLogin    : 9/18/2016 11:07:41 AM
PwdLastSet   : False
PwdExpired   : False
UserFlags    : 66147

ComputerName : client2
AccountName  : TESTDOMAIN/client2/test user
SID          : S-1-5-21-4738845342-2774817237-2297341088-1006
Description  :
Disabled     : False
IsGroup      : False
IsDomain     : False
LastLogin    : False
PwdLastSet   : 9/13/2016 3:30:29 PM
PwdExpired   : False
UserFlags    : 66049
```

*FIG. 2A*

```
PS C:\Users\user1.TESTDOMAIN.000> Get-NetLocalGroup -ComputerName
          "client3" -GroupName "Guests"

ComputerName : client3
AccountName  : TESTDOMAIN/client3/Guest
SID          : S-1-5-21-4738453342-2774817237-2297341088-501
Description  : Built-in account for guest access to the computer/
               domain
Disabled     : True
IsGroup      : False
IsDomain     : False
LastLogin    :
PwdLastSet   : 9/18/2016 11:06:51 AM
PwdExpired   : False
UserFlags    : 66147

ComputerName : client3
AccountName  : TESTDOMAIN/client3/test user
SID          : S-1-5-21-4738453342-2774817237-2297341088-1006
Description  :
Disabled     : False
IsGroup      : False
IsDomain     : False
LastLogin    :
PwdLastSet   : 9/13/2016 3:30:29 PM
PwdExpired   : False
UserFlags    : 66049
```

```
PS C:\Users\user1.TESTDOMAIN.000> Get-NetLocal
Group -ComputerName "client3" -GroupName "Guests"
ComputerName : client3
AccountName  : TESTDOMAIN/client3/Guest
SID          : S-1-5-21-473845342-2774817237
               -2297341088-501
Description  : Built-in account for guest access
               to the computer/domain
Disabled     : True
IsGroup      : False
IsDomain     : False
LastLogin    :
PwdLastSet   : 9/18/2016 11:46:47 AM
PwdExpired   : False
UserFlags    : 66147

ComputerName : client3
AccountName  : TESTDOMAIN/client3/test_user
SID          : S-1-5-21-473845342-2774817237
               -2297341088-1006
Description  :
Disabled     : False
IsGroup      : False
IsDomain     : False
LastLogin    :
PwdLastSet   : 9/13/2016 3:30:29 PM
PwdExpired   : False
UserFlags    : 66049

ComputerName : client3
AccountName  : TESTDOMAIN/client3/new_user
SID          : S-1-5-21-473845342-2774817237
               -2297341088-1008
Description  :
Disabled     : False
IsGroup      : False
IsDomain     : False
LastLogin    :
PwdLastSet   : 9/18/2016 11:46:17 AM
PwdExpired   : False
UserFlags    : 66049
```

*FIG. 3A*

```
PS C:\Users\user1.TESTDOMAIN.000> Get-NetLocal
Group -ComputerName "client3Prep" -Group Name "Guests"
ComputerName : Client3Prep
AccountName  : TESTDOMAIN/Client3/Guest
SID          : S-1-5-21-2937651619
               -4167467795-303580696-501
Description  : Built-in account for guest access
               to the computer/domain
Disabled     : True
IsGroup      : False
IsDomain     : False
LastLogin    :
PwdLastSet   : 9/19/2016 11:24:21 AM
PwdExpired   : False
UserFlags    : 66147

ComputerName : client3Prep
AccountName  : TESTDOMAIN/client3Prep/test_user
SID          : S-1-5-21-2937651619
               -4167467795-303580696-1006
Description  :
Disabled     : False
IsGroup      : False
IsDomain     : False
LastLogin    :
PwdLastSet   : 9/13/2016 3:30:29 PM
PwdExpired   : False
UserFlags    : 66049

ComputerName : client3Prep
AccountName  : TESTDOMAIN/client3Prep/
               new_user
SID          : S-1-5-21-2937651619
               -4167467795-303580696-1008
Description  :
Disabled     : False
IsGroup      : False
IsDomain     : False
LastLogin    :
PwdLastSet   : 9/18/2016 11:46:17 AM
PwdExpired   : False
UserFlags    : 66049
```

*FIG. 3B*

```
40 0.71B104  10.10.10.2      10.10.10.6       SAMR  177 EnumDomainUsers request
44 0.819671  10.10.10.6      10.10.10.2       SAMR  782 EnumDomainUsers response
   Count: 5
   ⊿ Pointer to Entries (samr_SamEntry)
       Referent ID: 0x00020004
       Max Count: 5
     ▷ Entries
     ⊿ Entries
         Idx: 1004
       ⊿ Name:
           Name Len: 14
           Name Size: 32
         ⊿ Name
             Referent ID: 0x0002000c
             Max Count: 16
             Offset: 0
             Actual Count: 7
             Name: GP user
```

*FIG. 6*

| Username | Domain | SID | Group | Full Name |
|---|---|---|---|---|
| Administrator | ALIV-DXB-TESTPC | S-1-5-21-394 | Local User | |
| Default Account | ALIV-DXB-TESTPC | S-1-5-21-394 | Local User | |
| Guest | ALIV-DXB-TESTPC | S-1-5-21-394 | Local User | |
| MSSQLSERVER01 | ALIV-DXB-TESTPC | S-1-5-21-394 | Local User | MSSQLSERV |
| MSSQLSERVER02 | ALIV-DXB-TESTPC | S-1-5-21-394 | Local User | MSSQLSERV |
| MSSQLSERVER03 | ALIV-DXB-TESTPC | S-1-5-21-394 | Local User | MSSQLSERV |
| MSSQLSERVER04 | ALIV-DXB-TESTPC | S-1-5-21-394 | Local User | MSSQLSERV |
| MSSQLSERVER05 | ALIV-DXB-TESTPC | S-1-5-21-394 | Local User | MSSQLSERV |
| MSSQLSERVER06 | ALIV-DXB-TESTPC | S-1-5-21-394 | Local User | MSSQLSERV |
| MSSQLSERVER07 | ALIV-DXB-TESTPC | S-1-5-21-394 | Local User | MSSQLSERV |
| MSSQLSERVER08 | ALIV-DXB-TESTPC | S-1-5-21-394 | Local User | MSSQLSERV |
| MSSQLSERVER09 | ALIV-DXB-TESTPC | S-1-5-21-394 | Local User | MSSQLSERV |
| MSSQLSERVER10 | ALIV-DXB-TESTPC | S-1-5-21-394 | Local User | MSSQLSERV |
| MSSQLSERVER11 | ALIV-DXB-TESTPC | S-1-5-21-394 | Local User | MSSQLSERV |
| MSSQLSERVER12 | ALIV-DXB-TESTPC | S-1-5-21-394 | Local User | MSSQLSERV |
| MSSQLSERVER13 | ALIV-DXB-TESTPC | S-1-5-21-394 | Local User | MSSQLSERV |
| MSSQLSERVER14 | ALIV-DXB-TESTPC | S-1-5-21-394 | Local User | MSSQLSERV |
| MSSQLSERVER15 | ALIV-DXB-TESTPC | S-1-5-21-394 | Local User | MSSQLSERV |
| MSSQLSERVER16 | ALIV-DXB-TESTPC | S-1-5-21-394 | Local User | MSSQLSERV |
| MSSQLSERVER17 | ALIV-DXB-TESTPC | S-1-5-21-394 | Local User | MSSQLSERV |
| MSSQLSERVER18 | ALIV-DXB-TESTPC | S-1-5-21-394 | Local User | MSSQLSERV |
| MSSQLSERVER19 | ALIV-DXB-TESTPC | S-1-5-21-394 | Local User | MSSQLSERV |
| MSSQLSERVER20 | ALIV-DXB-TESTPC | S-1-5-21-394 | Local User | MSSQLSERV |

*FIG. 7*

```
newuser <1004>/Fullname: New User
newuser <1004>/UserComment:
newuser <1004>/PrimaryGroupId: 513
newuser <1004>/BadPasswordCount: 0          801
newuser <1004>/LogonCount: 0
newuser <1004>/LastLogon: 1601-01-01 00:00:00
```

*FIG. 8A*

```
newuser <1004>/Fullname: New User
newuser <1004>/UserComment:
newuser <1004>/PrimaryGroupId: 513
newuser <1004>/BadPasswordCount: 0
newuser <1004>/LogonCount: 1
newuser <1004>/LastLogon: 2016-09-15
                         12:42:12.675018        802
```

*FIG. 8B*

```
Administrator <500>/FullName:
Administrator <500>/UserComment:
Administrator <500>/PrimaryGroupId: 513
Administrator <500>/BadPasswordCount: 0    901
Administrator <500>/LogonCount: ?
```

*FIG. 9A*

```
Administrator <500>/FullName:
Administrator <500>/UserComment:
Administrator <500>/PrimaryGroupId: 513
Administrator <500>/BadPasswordCount: 12964
Administrator <500>/LogonCount: ?
```

*FIG. 9B*         901

```
Server      : CLIENT2
AccountName: VLAB1/CLIENT2/Administrator
SID         : S-1-5-21-2855241813-3116034789
              -286929080-500
Disabled    : True
IsGroup     : False
IsDomain    : False
LastLogin   : 4/13/2014/ 5:37:53 PM Server      : CLIENT2
AccountName: VLAB1/CLIENT2/testadmin
SID         : S-1-5-21-2855241813-3116034789
              -286929080-1001
Disabled    : False
IsGroup     : False
IsDomain    : False
LastLogin   : 8/5/2015/ 2:51:48 PM Server      : CLIENT2
AccountName: VLAB1/CLIENT2/USER2
SID         : S-1-5-21-2855241813-3116034789
              -286929080-1002
Disabled    : False
IsGroup     : False
IsDomain    : False
LastLogin   : 8/31/2016/ 11:25:41 AM Server      : CLIENT2
AccountName: VLAB1.com/Domain Admins
SID         : S-1-5-21-3383964581-1309953776
              -2693364552-512
Disabled    : False
IsGroup     : True
IsDomain    : True
LastLogin   :

Server      : CLIENT2
AccountName: VLAB1.com/USER2
SID         : S-1-5-21-3383964581-1309953776
              -2693364552-1106
Disabled    : False
IsGroup     : False
IsDomain    : True
LastLogin   : 9/15/2016/ 5:19:55 PM
```

*FIG. 10A*

```
Server       : CLIENT2
AccountName  : VLAB1/CLIENT2/Administrator
SID          : S-1-5-21-2855241813-3116034789-286929080-500
Disabled     : True
IsGroup      : False
IsDomain     : False
LastLogin    : 4/13/2014/ 5:37:53 PM Server       : CLIENT2
AccountName  : VLAB1/CLIENT2/testadmin
SID          : S-1-5-21-2855241813-3116034789-286929080-1001
Disabled     : False
IsGroup      : False
IsDomain     : False
LastLogin    : 8/5/2015/ 2:51:48 PM Server       : CLIENT2
AccountName  : VLAB1/CLIENT2/USER2
SID          : S-1-5-21-2855241813-3116034789-286929080-1002
Disabled     : False
IsGroup      : False
IsDomain     : False
LastLogin    : 8/31/2016/ 11:25:41 AM Server       : CLIENT2
AccountName  : VLAB1.com/Domain Admins
SID          : S-1-5-21-3383964581-1309953776-2693364552-512
Disabled     : False
IsGroup      : True
IsDomain     : True
LastLogin    :

Server       : CLIENT2
AccountName  : VLAB1.com/USER2
SID          : S-1-5-21-3383964581-1309953776-2693364552-1106
Disabled     : False
IsGroup      : False
IsDomain     : True
LastLogin    : 9/15/2016/ 5:19:55 PM                    ⎯1001

Server       : CLIENT2
AccountName  : VLAB1/CLIENT2/MaliciousUser
SID          : S-1-5-21-2855241813-3116034789-286929080-1005
Disabled     : False
IsGroup      : False
IsDomain     : FALSE
LastLogin    :
```

*FIG. 10B*

```
Server       : CLIENT2
AccountName: VLAB1/CLIENT2/Administrator
SID          : S-1-5-21-2855241813-3116034789
               -286929080-500
Disabled     : True
IsGroup      : False
IsDomain     : False
LastLogin    : 4/13/2014/ 5:37:53 PM Server       : CLIENT2
AccountName: VLAB1/CLIENT2/testadmin
SID          : S-1-5-21-2855241813-3116034789
               -286929080-1001
Disabled     : False
IsGroup      : False
IsDomain     : False
LastLogin    : 8/5/2015/ 2:51:48 PM Server       : CLIENT2
AccountName: VLAB1/CLIENT2/USER2
SID          : S-1-5-21-2855241813-3116034789
               -286929080-1002
Disabled     : False
IsGroup      : False
IsDomain     : False
LastLogin    : 8/31/2016/ 11:25:41 AM          ─1101

Server       : CLIENT2
AccountName: VLAB1.com/Domain Admins
SID          : S-1-5-21-3383964581-1309953776
               -269364552-512
Disabled     : False
IsGroup      : True
IsDomain     : True
LastLogin    :

Server       : CLIENT2
AccountName: VLAB1.com/USER2
SID          : S-1-5-21-3383964581-1309953776
               -269364552-1106
Disabled     : False
IsGroup      : False
IsDomain     : True
LastLogin    : 9/15/2016/ 5:19:55 PM
```

*FIG. 11A*

```
Server      : CLIENT2
AccountName : VLAB1/CLIENT2/Administrator
SID         : S-1-5-21-2855241813-3116034789
              -286929080-500
Disabled    : True
IsGroup     : False
IsDomain    : False
LastLogin   : 4/13/2014/ 5:37:53 PM Server      : CLIENT2
AccountName : VLAB1/CLIENT2/testadmin
SID         : S-1-5-21-2855241813-3116034789
              -286929080-1001
Disabled    : False
IsGroup     : False
IsDomain    : False
LastLogin   : 8/5/2015/ 2:51:48 PM Server      : CLIENT2
AccountName : VLAB1/CLIENT2/USER2
SID         : S-1-5-21-2855241813-3116034789
              -286929080-1002
Disabled    : False
IsGroup     : False
IsDomain    : False
LastLogin   : 8/31/2016/ 11:25:41 AM         1102

Server      : CLIENT2
AccountName : VLAB1/CLIENT2/MaliciousUser
SID         : S-1-5-21-2855241813-3116034789
              -286929908-1005
Disabled    : False
IsGroup     : False
IsDomain    : False
LastLogin   :
```

*FIG. 11B*

```
PS C:\Users\user1.TESTDOMAIN.000>
    Get-NetLocalGroup -ComputerName
 "Client3Prep" -GroupName "Guests"
ComputerName: Client3Prep
AccountName : TESTDOMAIN/Client3Prep/Guest
SID         : S-1-5-21-2937651619-4167467795-
              303580696-501
Description : Built-in account for guest
              access to the computer/domain
Disabled    : True
IsGroup     : False
IsDomain    : False
LastLogin   :
PwdLastSet  : 9/19/2016 11:24:21 AM
PwdExpired  : False
UserFlags   : 66147
ComputerName: Client3Prep
AccountName : TESTDOMAIN/Client3Prep/test
              _user
SID         : S-1-5-21-2937651619-4167467795
              -303580696-1006
Description :
Disabled    : False
IsGroup     : False
IsDomain    : False
LastLogin   :
PwdLastSet  : 9/13/2016 3:30:29 PM
PwdExpired  : False
UserFlags   : 66049
ComputerName: Client3Prep
AccountName : TESTDOMAIN/Client3Prep/new_user
SID         : S-1-5-21-2937651619-4167467795
              -303580696-1008
Description :
Disabled    : False
IsGroup     : False
IsDomain    : False
LastLogin   :
PwdLastSet  : 9/18/2016 11:46:17 AM
PwdExpired  : False
UserFlags   : 66049
```

*FIG. 12A*

```
PS C:\Users\user1.TESTDOMAIN.000>
    Get-NetLocalGroup -ComputerName
      "client3" -GroupName "Guests"
ComputerName: client3
AccountName : TESTDOMAIN/client3/Guest
SID         : S-1-5-21-473845342-2774817237-
              2297341088-501
Description : Bulit-in account for guest
              access to the computer/domain
Disabled    : True
IsGroup     : False
IsDomain    : False
LastLogin   :
PwdLastSet  : 9/18/2016 11:46:47 AM
PwdExpired  : False
UserFlags   : 66147
ComputerName: client3
AccountName : TESTDOMAIN/client3/test_user
SID         : S-1-5-21-473845342-2774817237
              -2297341088-1006
Description :
Disabled    : False
IsGroup     : False
IsDomain    : False
LastLogin   :
PwdLastSet  : 9/13/2016 3:30:29 PM
PwdExpired  : False
UserFlags   : 66049
ComputerName: client3
AccountName : TESTDOMAIN/client3/new_user
SID         : S-1-5-21-473845342-2774817237
              -2297341088-1008
Description :
Disabled    : False
IsGroup     : False
IsDomain    : False
LastLogin   :
PwdLastSet  : 9/18/2016 11:46:17 AM
PwdExpired  : False
UserFlags   : 66049
```

*FIG. 12B*

DETECTING LOCAL USER SECURITY-RELATED ANOMALIES USING ACTIVE SCANS

CROSS-REFERENCE TO RELATED APPLICATIONS

This application claims the benefit of the filing date of U.S. Provisional Patent Application No. 62/409,558 which is titled "Detecting Local Users Security-Related Anomalies Using Active Scans" and was filed Oct. 18, 2016, the disclosure of which is hereby incorporated by reference herein in its entirety.

BACKGROUND

Advanced targeted attacks may use compromised credentials in order to move laterally within a victim network. The compromised credentials consist of either domain or local credentials. Local credentials, such as local admin credentials, are a lucrative target for attackers because they are typically not as actively managed or monitored as domain credentials (i.e., less stringent password complexity/change policies, and no traffic logs outside the specific computer). If an attacker can access a machine using compromised local credentials, the attacker may then be able access other machines in the network.

For example, in a local administrator attack (referred to as "Pass the Hash"), attackers take advantage of the fact that organizations often configure all systems with the same local administrator password. If an attacker is able to compromise the hash representation of the password, then the attacker can use the hash to authenticate and execute commands on other systems on the network or in the domain that have the same password. This is exacerbated by the fact that the attacker only needs the hashes. The attacker does not need to crack the password at all.

Once an attacker has access to a local machine, a new user may be added, such as to the admin group and/or with no expiration, that will allow the attacker to access that machine in the future. Those later attacks will use the unauthorized user and password to access the machine for fraudulent or malicious reasons. This activity on a local device is not visible to a network security device because no network traffic is involved when accessing the local machine.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, local users' activity is visible without installing an agent on a monitored machine. The visibility is based on periodic scans of the local users' directory, such as the Windows Security Account Manager (SAM), using the standard protocol messages and APIs of a remote admin interface, such as SAMs Remote (SAMR) protocol. Using the remote admin interface, defenders gain visibility to local users' logons, group membership, password changes, and other parameters. Security applications enabled by this visibility include, but are not limited to, abnormal logons detection, abnormal group addition and removal detection, and abnormal password changes detection.

As noted above, network based security devices have no visibility to local activity on individual machines. A solution to the local user visibility problem is periodically query local user data using a remote administrative interface. Data regarding user information and group membership is collected during these periodic inspections. By comparing changes in the user information and group membership, the security issues may be discovered:
- Abnormal login patterns
- Brute force attempts
- Privileged group modifications
- Password configuration issues

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIGS. 2A and 2B illustrate an example of the local users on a machine and on its duplicate.

FIGS. 3A and 3B illustrate an example machine before and after running the System Preparation tool.

FIG. 6 illustrates an example local user defined by the GPO is returned when enumerating all local users.

FIG. 7 illustrates an example database server creating twenty specific users and a group to implement some R functionality.

FIGS. 8A and 8B illustrate detection of a dormant local user logon anomaly that can be achieved using the methods described herein.

FIGS. 9A and 9B illustrate detection of a local user brute force logon anomaly that can be achieved using the methods described herein.

FIGS. 10A and 10B illustrate detection of an anomaly involving a local user added to a privileged local group.

FIGS. 11A and 11B illustrate detection of an anomaly involving a local user who is removed from a privileged local group or where the membership of the group has changed.

FIGS. 12A and 12B illustrate detection of an anomaly involving shallow copies of local users. In some cases, a new machine may be created by duplicating an existing machine.

DETAILED DESCRIPTION

Figure 1:
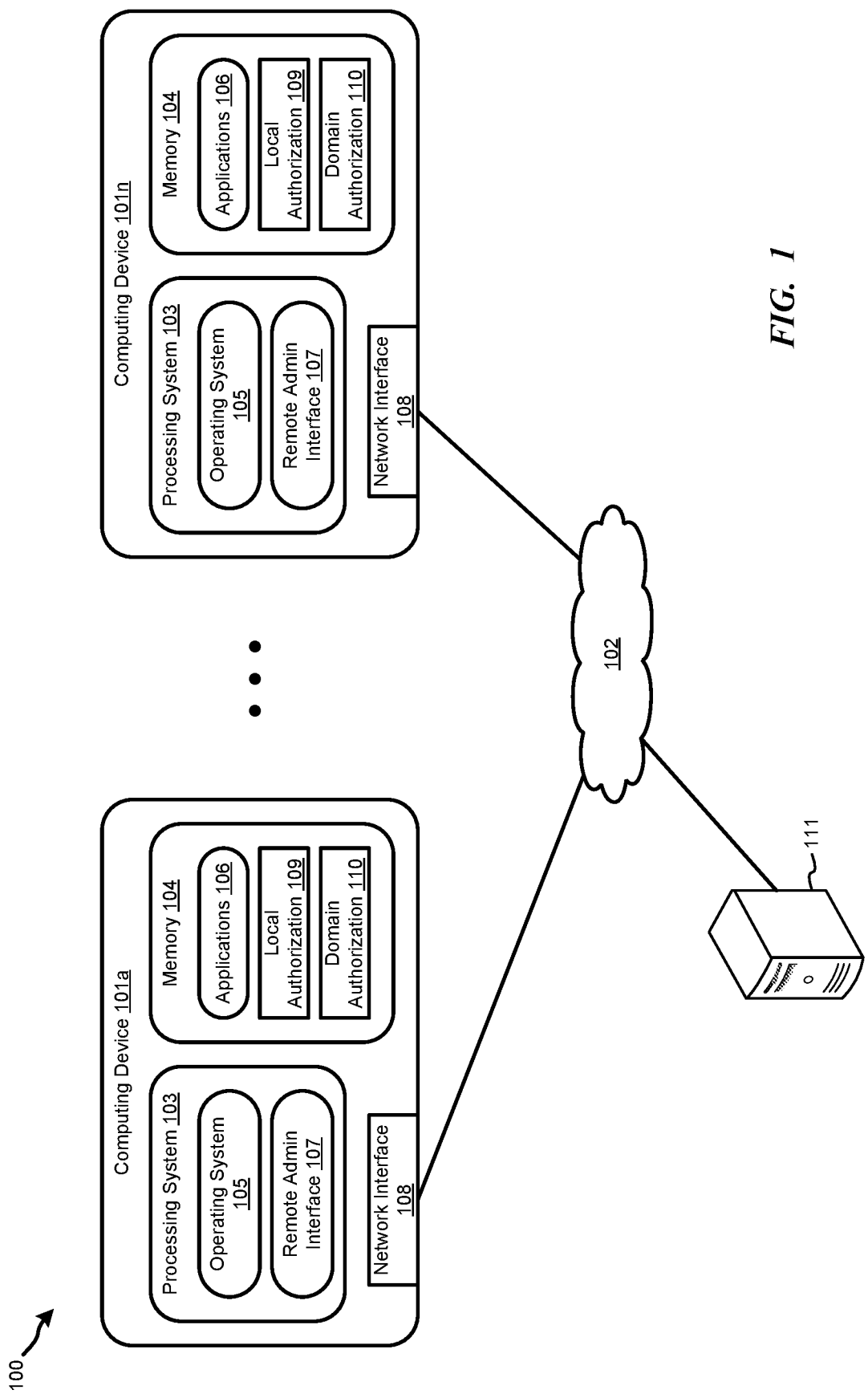
FIG. 1 is an illustration of an environment in an example implementation that is operable to detect local user security-related anomalies using active scans in order to provide the attack-protection techniques.

FIG. 1 is an illustration of an environment 100 in an example implementation that is operable to detect local user security-related anomalies using active scans in order to provide the attack-protection techniques described herein. The illustrated environment 100 includes a plurality of computing devices 101a-n that are configurable in a variety of ways. For example, each computing device 101 may be configured as a computer that is capable of communicating over a network 102, such as a desktop computer, a tablet, a smart phone, a mobile station, an entertainment appliance, a set-top box that is communicatively coupled to a display device, a game console, a wearable device, and so forth. Thus, the computing devices 101a-n range from full-resource devices with substantial memory and processor resources (e.g., personal computers, game consoles) to low-resource devices with limited memory and/or processing resources (e.g., traditional set-top boxes, hand-held game consoles). Additionally, although individual computing devices 101a-n are shown, the computing devices may be representative of a plurality of different devices, such as multiple servers utilized by an enterprise to perform operations such as by a web service, a remote control and set-top box combination, an image capture device and a game console configured to capture gestures, and so on. Alternatively, individual computing devices 101 may be different virtual machines on a server or in a datacenter.

The computing devices 101a-n are illustrated as including a variety of hardware components, such as, for example, a processing system 103 and a computer-readable storage medium illustrated as memory 104. The processing system 103 is representative of any functionality, such as a processor or machine, for performing operations through execution of instructions stored in the memory 104. The processing system 103, for instance, may include a plurality of cores that are each configured to independently execute program instructions. Although illustrated separately, functionality of these components may be further divided, combined (e.g., on an application specific integrated circuit), and so forth.

The computing devices 101a-n are further illustrated as including an operating system 105. The operating system 105 is configured to abstract underlying functionality of each computing device 101 to applications 106 that are executable on the computing device 101. For example, the operating system 105 may abstract processing system 103, memory 104 and other hardware functionality of the computing device 101 such that the applications 106 may be written without knowing how this underlying functionality is implemented. The application 106, for instance, may provide data to the operating system 105 to be rendered and displayed by a display device or printer without understanding how this rendering will be performed. The operating system 105 may also represent a variety of other functionality, such as to manage a file system and user interface that is navigable by a user of the computing device 101.

The processing system 103 is also illustrated as including a remote administrative interface 107 that allows a user on one computing device 101a to access a remote computing device 101n and to query the state of various features of the remote computing device 101n. For example, computing devices 101a-n may include a network interface 108 that provides communication with a network 102. Computing devices 101a-n may be independent machines and network 102 may be any public or private network, such as the Internet or an intranet or enterprise network. Alternatively, computing devices may be different virtual machines and network 102 may be a communication bus on a server or a local area network in a datacenter.

The memory 104 on each computing device 101 may comprise a security account database that stores credentials for users and groups that are authorized to access the computing device 101. These credentials may comprise, for example, both local user authorization credentials 109 and domain user authorization credentials 110.

In one process for an interactive logon to a computing device 101, a local security authority verifies the credentials entered against the known record, including local authorization credentials 109 and domain authorization credentials 110. The local security authority does this by passing logon credentials to an authentication application that does the actual verification. For example, in a Windows-based machine, the default authentication packages are Kerberos for domain users and MSV1_0 for local users. In Kerberos, the credentials are verified against a domain controller, while in MSV1_0 the credentials are verified against a local security accounts manager database. This database is encrypted and stored in the registry. The interactive logon to the computing device 101a may be initiated from a machine 101n on same domain or from an unrelated machine 111.

The local authentication on a computing device 101 allows the user to logon locally without being part of the domain, such as logging on to a personal computer when it is offline. The domain authentication allows the user to logon with authentication against the domain controller, which then allows the user to access both the local computing device 101 in addition to network sources, such as all other computing devices 101a-n.

Local users and groups can be viewed using a local users and groups manager tool. This tool can be used to create and delete local users and groups, as well as adding/removing accounts from groups. It can also be used to view group members and group membership for accounts. The tool reveals a small portion of the actual information stored on each user and group.

The local security accounts manager database can be queried using a remote admin interface protocol. The protocol exposes both local and domain accounts in the security accounts database for a remote authenticated domain user. Certain objects may be exposed by the remote admin interface protocol, such as server, domain, group, alias, and user objects. These objects can be updated and read using the remote admin interface protocol. Additionally, the user, group, and alias objects may be created and deleted.

The remote admin interface protocol provides API calls that are of particular interest for detecting local user security-related anomalies. Among these are the enumerate and query methods listed in Table 1, which are used to reveal details about the local users and groups on a remote machine.

TABLE 1

| API Name | Description |
| --- | --- |
| EnumerateGroupsInDomain | Enumerates all groups given a domain handle. |
| EnumerateUsersInDomain | Enumerates all users given a domain handle. |
| EnumerateAliasesInDomain | Enumerates all aliases given a domain handle. It should be noted that built-in groups are aliases (in the built-in domain). |
| GetAliasMembership | Obtains the union of all aliases that a given set of SIDs is a member of (takes an array of SIDs). |
| LookupNamesInDomain | Translates a set of account names into a set of RIDs (gets an array of strings representing user names, and returns 2 arrays: an array of RIDs and an array of SID_NAME_USE enumeration |

TABLE 1-continued

| API Name | Description |
| --- | --- |
| | values that describes the type of the accounts). |
| LookupIdsInDomain | Translates a set of RIDs into account names (gets an array of RIDs and returns 2 array: an array of account names and an array of SID_NAME_USE enumeration values that describes the type of the accounts). |
| GetMembersInGroup | Reads the members of a group (returns a structure containing an array of RIDs, as well as an array of attribute values). |
| GetMembersInAlias | Obtains the membership list of an alias (an array of SIDs). |
| GetGroupsForUser | Obtains a listing of groups (array of RIDs) that a user is a member of. |
| GetUserDomainPasswordInformation | Gets a user handle and returns the password policy information (min/max password length, lockout duration, complexity, etc.) from the user's domain (does not require a domain handle). |
| GetDomainPasswordInformation | Obtains select password policy information (without authenticating to server). |
| QueryInformationGroup | Returns very general information about the group - name, number of members and description. |
| QueryInformationAlias | Returns very general information about the alias - name, number of members and description. |
| QueryInformationUser | Returns information about the user. This information includes - account name, user's full name, primary group ID, last logon time, last password change, allowed logon hours, logon count and bad password count. |
| QueryInformationDomain | Returns information about the domain - password policy (min. password length, password history length, password complexity properties, max. and min. password age), lockout duration, force logoff time, number of groups, number of users and aliases. |
| QueryDisplayInformation | A generic method that enables to query many objects for their information. It takes the type of objects and the indexes to query as input. |
| QuerySecurityObject | Queries the access control on a server, domain, user, group, or alias object. |

The QueryUserInfo and QueryUserInfo2 API calls are used to retrieve user information. This information includes the name, security identifier (SID), status, and last password change time for every account. It also returns the last time the account logged on to the machine. This includes interactive logon, remote interactive logon, network logon and service account logon.

The basic flow of using the remote admin interface protocol is as follows:
 Connect to a server (the remote machine);
 Enumerate/query the server for domains;
 Open the domain of interest;
 Enumerate/query a user or alias/group in the domain.

In some embodiments, any domain user may have the capability to query any computing device 101a-n. In other embodiments, remote admin interface protocol permissions can be configured, for example, by setting a registry value. The default value of this registry parameter may be changed to limit the remote admin interface protocol querying to local administrators only.

Suspicious local activity can be detected using the remote admin interface protocol. Defenders can use the aforementioned remote admin interface protocol capabilities in order to gain visibility to local users' activities. By periodically querying the monitored machines using of some domain user credentials, defenders can learn the current state of local users in a machine as well as identify changes to that state by comparing current to previous results.

The population of monitored machines may consist of all of the domain machines or a subset of it, such as only highly valuable assets.

The strategy for choosing the sampling period of scan may vary. It can be set to a global static period (e.g., hourly), global opportunistic period (e.g., start a new scan when the last one finishes), or even a per-machine cadence according to risk assessment (e.g., scan more valuable assets more frequently).

The following sections detail examples of practical applications for this visibility, including: detection rules that can be used for suspicious local activity detection, discovery of configuration issues, and enhanced visibility and insight to the function of the machine.

Detection of Suspicious Local Users' Login Behavior Using Login Times

Since the last login time property is updated on many different logins (interactive, network, service), it provides a wide coverage of logins to the machine. Monitoring this attribute over time (e.g., retrieving it once a day) can be beneficial to detect suspicious activity.

Suspicious login—users who logon to a machine after a very long time.

Vertical login—users who logon to many machines in a short period of time.

Detecting Modifications to Local High-Privileged Groups

Monitoring the local high privileged groups (e.g., the administrators group) over time can be used to detect whenever a new high-privileged entity has been added to or removed from these groups.

Attackers may add a user to such groups in order to persist their access. Attackers may remove existing users from such groups in order to limit legitimate administrators access to the machine.

Some of these default groups have high privileges, or might be considered a security threat:
 Administrators
 Backup Operators
 Remote Desktop Users
 Remote Management Users Detection of Local Users on Duplicate Machines.

When duplicating a machine, the local users are often duplicated along with all the other machine data. Hence, by compromising a single local account (specifically, a high privilege account), attackers can compromise other domain machines in which the same local account is defined. Machines can be duplicated in the following ways:
 1. Import and Export a Machine.

FIG. 2A illustrates local users on a given machine. FIG. 2B illustrates local users on a duplicate machine. All local user information remains the same on the duplicate machine.

In this case, all the local users and their information (including attributes such as "Last Login" and "Password Last Set" 201) are duplicated. However, when adding the machine to a domain, built-in account information may change depending on the policy of the domain (for example the "Password Last Set" attribute 201 of the built-in "Guest" user). The machine SID 202 (i.e., the local SID and not domain SID) is also duplicated, hence the same users would have the same SIDs 202 on duplicate machines.

2. System Preparation Tool (Sysprep).

FIG. 3A illustrates local account information before running the Sysprep tool. FIG. 3B illustrates local account information after running the Sysprep tool.

Sysprep is a tool for operating system deployment. Sysprep allows the preparation of a clean operating system installation for duplication. A feature of the Sysprep tool in one embodiment is the removal of system-specific data, such as the computer SID. When running the Sysprep tool on a machine:

A new machine SID is generated.
  All other local users and their information remains the same, except for the account SID, which changes according to the new machine SID; however, the account Relative Identifier (RID) does not change. Built-in account information may be changed according to the domain policy.

3. Local Users Created by Group Policy Objects (GPO)

Local admin passwords may be created and managed via Group Policy Objects. Although this method is known to be insecure, some organizations may still use it. To find local users created as a result of a GPO, the following steps may be taken:

Scan the System Volume (SYSVOL) share to find GPOs that define local users. The SYSVOL is a shared directory that stores the server copy of the domain's public files that must be shared for common access and replication throughout a domain.

Figures 4, 5:
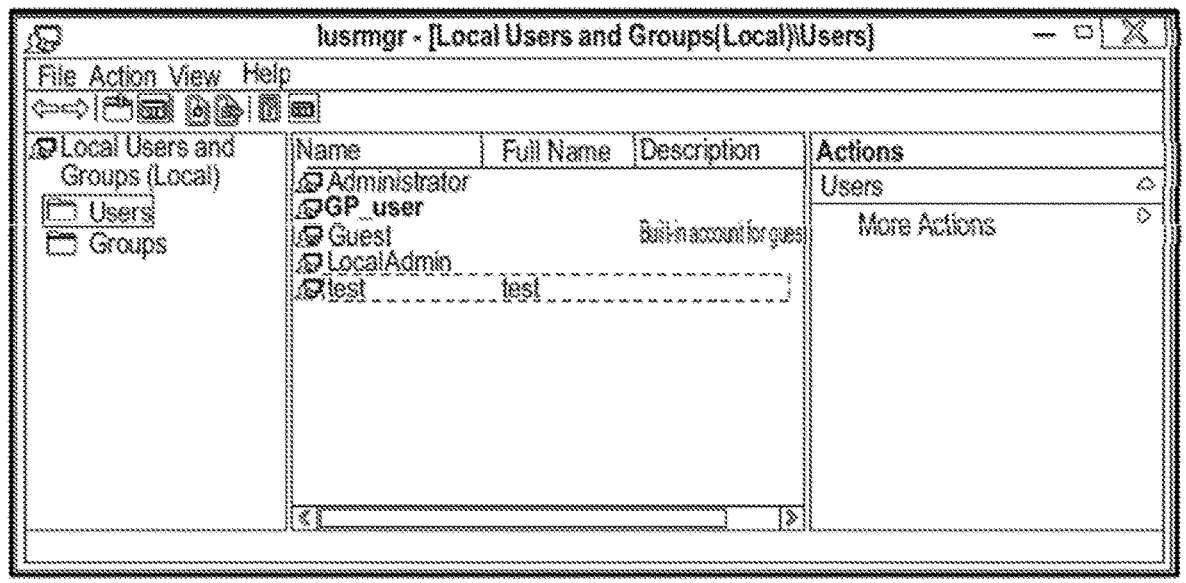
FIG. 4 illustrates an example GPO containing a local user.
FIG. 5 illustrates an example local user created by a GPO.

For example, FIG. 4 illustrates an example GPO containing a local user.

Find the machines on which these GPOs apply.
  Using the remote admin interface protocol (specifically, the "EnumerateUsersInDomain" API call), query the machines for their local user accounts and check whether they correspond to the users defined in the GPO (e.g., by comparing the account names). If such accounts are found, then an alert must be issued since such account can be compromised very easily because the password is also stored in the SYSVOL share.

FIG. 5 illustrates an example local user created by a GPO.

FIG. 6 illustrates an example local user defined by the GPO is returned when enumerating all local users.

4. Enhanced Visibility

Certain programs add local groups and users to the machine. Using that information, insight on the functionality of the system might be deducted.

FIG. 7 illustrates an example MSSQL database server creating twenty specific users and a group to implement some R functionality. In a default instance, the group name is SQLRUserGroup. In a named instance, the default group name is suffixed with the instance name: for example, SQLRUserGroupMyInstanceName. By default, the user account pool contains twenty user accounts, named MSSQLSERVER01 through MSSQLSERVER20 for the default instance. For a named instance, the user accounts are named using the instance name: for example, MyInstanceName01 through MyInstanceName20.

FIGS. 8A and 8B illustrate detection of a dormant local user logon anomaly that can be achieved using the methods described herein. Using the remote administrative interface protocol, the last logon times for users can be obtained and compared to prior last logon times. FIG. 8A illustrates an example of previously observed admin user information, including a prior reported last logon time 801. In this example, no admin user has logged on yet (i.e., the last logon time is January 01, 1601 at 00:00:00). FIG. 8B illustrates an example of current admin user information, including current last logon time 802. Comparing the current last logon time 802 to the prior last logon time 801 shows that the admin user logon has been used in the interim period. This activity may indicate that an attack has taken place if it is not normal practice for the admin user to logon to this machine.

FIGS. 9A and 9B illustrate detection of a local user brute force logon anomaly that can be achieved using the methods described herein. Using the remote administrative interface protocol, the bad password count for users can be obtained and compared to prior bad password counts. FIG. 9A illustrates an example of previously observed admin user information, including a prior reported bad password count 901. In this example, no bad admin user passwords have been used during logon attempts. FIG. 9B illustrates an example of current admin user information, including current bad password count 902. Comparing the current bad password count 902 to the prior bad password count 901 shows that very many failed logon attempts (12,964) have been attempted for the admin user account. A defender monitoring the admin user account activity may take remedial action, such as modifying the admin user account name or group membership.

FIGS. 10A and 10B illustrate detection of an anomaly involving a local user added to a privileged local group. Using the remote administrative interface protocol, the member list for an admin group can be obtained and compared to prior member lists for the admin group. FIG. 10A illustrates an example of previously observed member list for the admin group. FIG. 10B illustrates an example of current member list for the admin group, including newly added user 1001. Comparing the current member list for the admin group to the prior member list shows that new member 1001 has been added to admin group. A defender monitoring the activity on the local machine may further investigate this new member and verify whether that user was properly added to the admin group.

FIGS. 11A and 11B illustrate detection of an anomaly involving a local user who is removed from a privileged local group or where the membership of the group has changed. Using the remote administrative interface protocol, the member list for an admin group can be obtained and compared to prior member lists for the admin group. FIG. 11A illustrates an example of previously observed member list for the admin group, including members 1101. FIG. 11B illustrates an example of current member list for the admin group, including newly added user 1102. Comparing the current member list for the admin group to the prior member list shows that prior members 1101 have been removed from the group and new member 1102 has been added to admin group. A defender monitoring the activity on the local machine may further investigate this new member and verify whether that user was properly added to the admin group. An attacker may have deleted valid members 1101 to prevent an admin user from logging on to a hacked machine.

FIGS. 12A and 12B illustrate detection of an anomaly involving shallow copies of local users. In some cases, a new machine may be created by duplicating an existing machine. For example, a new machine may be created using a hard drive copy or virtual machine (VM) export operation. The users on the existing machine may also be duplicated on the new machine as part of this process. As a result, one or more users on the new machine may have the identical name and password as users on the existing machine. Using the remote administrative interface protocol, the member list for an admin group on one machine can be obtained and compared to the admin group on another machine. FIG. 12A illustrates an admin group obtained from a first machine. FIG. 12B illustrates the admin group obtained from a second machine. Comparing these admin group lists shows that certain users are duplicates. For example, the account names, SIDs, and password last set dates may be the same on both machines for one or more users. A defender monitoring the admin user account activity may take remedial action, such as modifying the admin user account name, password, and/or group membership.

Figure 13:
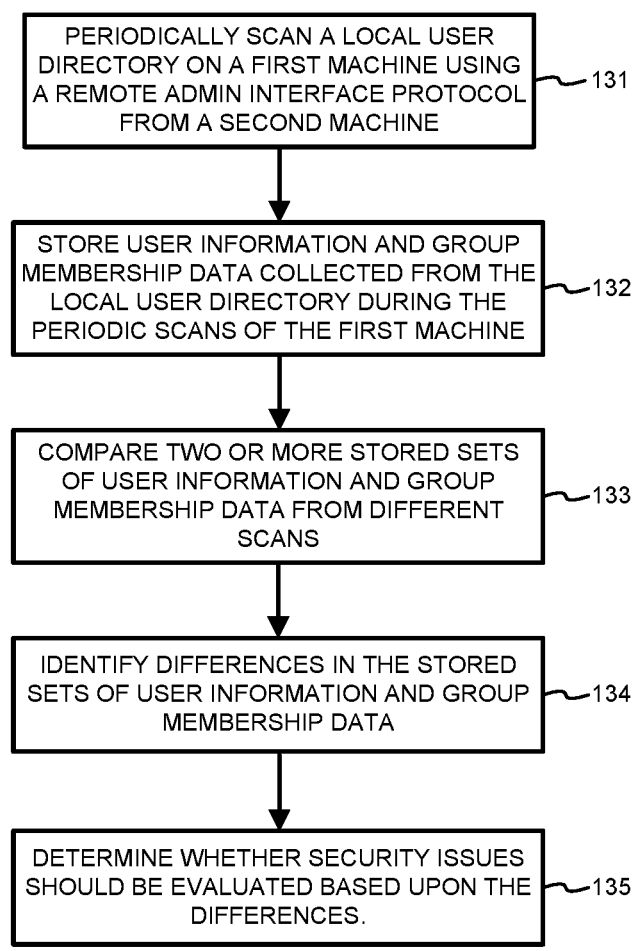
FIG. 13 is a flowchart of a computer-implemented method according to one embodiment.

FIG. 13 is a flowchart of a computer-implemented method according to one embodiment. In step 131, a local user directory on a first machine is periodically scanned using a remote admin interface protocol from a second machine. In step 132, user information and group membership data that was collected from the local user directory during the periodic scans of the first machine is stored. In step 133, two or more stored sets of user information and group membership data from different scans are compared. In step 134, differences are identified in the stored sets of user information and group membership data. In step 135, the method determines whether security issues should be evaluated based upon the differences. The differences may comprise, for example, changes in the last logon time for a dormant local user, changes in a bad password count for a local user, users added to a list of local users in an admin group, and/or users removed from a list of local users in an admin group.

The method of FIG. 13 may be further expanded to additional machines by periodically scanning a local user directory on a third machine using the remote admin interface protocol, comparing two or more stored sets of user information and group membership data from the first machine and the third machine, and identifying one or more identical sets of user information on both the first and third machines.

Figure 14:
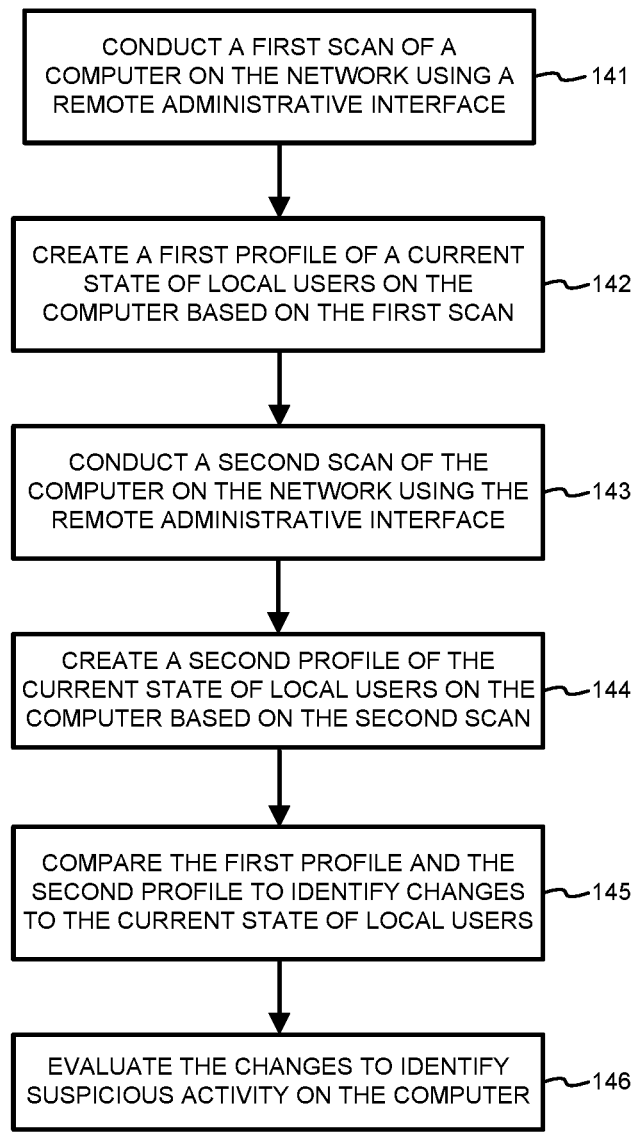
FIG. 14 is a flowchart of a computer-implemented method according to another embodiment.

FIG. 14 is a flowchart of a computer-implemented method according to another embodiment. In step 141, a first scan of a computer on the network is conducted using a remote administrative interface. In step 142, a first profile of a current state of local users on the computer is created based on the first scan. In step 143, a second scan of the computer on the network is conducted using the remote administrative interface. In step 144, a second profile of the current state of local users on the computer based on the second scan. In step 145, the first profile and the second profile are compared to identify changes to the current state of local users. In step 146, the changes are evaluated to identify suspicious activity on the computer.

The first and second scans of the computer may be initiated from a second computer on the network. The changes may comprise, for example, changes in the last logon time for a dormant local user, changes in a bad password count for a local user, users added to a list of local users in an admin group, and/or users removed from a list of local users in an admin group.

An example computer-implemented method comprises periodically scanning a local user directory on a first machine using a remote admin interface protocol from a second machine, storing user information and group membership data collected from the local user directory during the periodic scans of the first machine, comparing two or more stored sets of user information and group membership data from different scans, identifying differences in the stored sets of user information and group membership data, and determining whether security issues should be evaluated based upon the differences.

The identified differences may comprise changes in the last logon time for a dormant local user, changes in a bad password count for a local user, one or more users added to a list of local users in an admin group, and/or one or more users removed from a list of local users in an admin group.

The method may further comprise periodically scanning a local user directory on a third machine using the remote admin interface protocol, comparing two or more stored sets of user information and group membership data from the first machine and the third machine, and identifying one or more identical sets of user information on both the first and third machines.

An example method for detecting attacks on a network comprises conducting a first scan of a computer on the network using a remote administrative interface; based on the first scan, creating a first profile of a current state of local users on the computer; conducting a second scan of the computer on the network using the remote administrative interface; based on the second scan, creating a second profile of the current state of local users on the computer; comparing the first profile and the second profile to identify changes to the current state of local users; and evaluating the changes to identify suspicious activity on the computer.

The first and second scans of the computer may be initiated from a second computer on the network.

The changes may comprise changes in the last logon time for a dormant local user, changes comprise changes in a bad password count for a local user, one or more users added to a list of local users in an admin group, and/or one or more users removed from a list of local users in an admin group.

An example distributed computer network comprises a plurality of machines, each machine comprising one or more processors and computer-readable storage media having stored thereon computer-executable instructions for execution by the one or more processors; a first machine comprising computer-executable instructions that cause the processor to: periodically scan a local user directory on one or more second machines using a remote admin interface protocol; store user information and group membership data collected from the local user directories during the periodic scans of the one or more second machines; identify one or more identical sets of user information from different machines; and evaluate the identical sets of user information to identify suspicious activity on the network.

The identical sets of user information may result from a shallow copy of a local user.

The identical sets of user information may comprise shared passwords, user names, and password time changes.

The first machine may further comprise computer-executable instructions that cause the processor to: compare two or more stored sets of user information and group membership data from different scans of a single machine; identify differences in the stored sets of user information and group membership data; and determine whether security issues should be evaluated based upon the differences.

The differences identified may comprise changes in the last logon time for a dormant local user, changes in a bad password count for a local user, one or more users added to a list of local users in an admin group, and/or one or more users removed from a list of local users in an admin group.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
periodically scanning a local user directory stored on a local computing system, the scanning being implemented by a remote computing system using a remote admin interface protocol that allows the remote computing system to access the local user directory stored on the local computing system;
storing user information and group membership data collected from the local user directory during the periodic scans of the local machine, the group membership data for a group identified by the group membership data including at least an account name of the group or a listing of members in the group;
comparing two or more stored sets of user information and group membership data from different scans of the periodic scans of the local machine;
identifying differences in the stored sets of user information and group membership data;
determining that security issues should be evaluated based upon the differences; and
based upon the security issues being elevated, causing a remedial action to be performed with respect to at least the identified differences in the stored sets of user information and group membership data, the remedial action comprising at least one of changing membership of the group or changing the account name of the group.

2. The method of claim 1, wherein the differences comprise changes in the last logon time for a dormant local user.

3. The method of claim 1, wherein the differences comprise changes in a bad password count for a local user.

4. The method of claim 1, wherein the differences comprise one or more users added to a list of local users in an admin group.

5. The method of claim 1, wherein the differences comprise one or more users removed from a list of local users in an admin group.

6. The method of claim 1, further comprising:
periodically scanning a local user directory on a third machine using the remote admin interface protocol;
comparing two or more stored sets of user information and group membership data from the first machine and the third machine; and
identifying one or more identical sets of user information on both the first and third machines.

7. The method of claim 1, wherein the remote computing system periodically scans the local user directory at the local computing system without installing a monitoring agent on the local computing system.

8. The method of claim 1, wherein the remote admin interface protocol comprises the Security Account Manager Remote (SAMR) protocol.

9. The method of claim 1, wherein the remote computing system periodically scans the local user directory by submitting a query to a local database stored at the local computing system.

10. The method of claim 1, wherein the remedial action comprises modifying the account name of the group.

11. A computing system comprising:
at least one processor; and
one or more storage media having stored instructions which are executable by the at least one processor to cause the computing system to implement a method that includes:
using a remote computing system to perform scanning of a local user directory stored on a local computing system, the scanning being implemented using a remote admin interface protocol that allows the remote computing system to access the local user directory stored on the local computing system;
storing user information and group membership data collected from the local user directory during the periodic scans of the local machine, the group membership data for a group identified by the group membership data including at least an account name of the group or a listing of members in the group;
comparing two or more stored sets of user information and group membership data from different scans of the periodic scans of the local machine;
identifying differences in the stored sets of user information and group membership data;
determining that security issues should be evaluated based upon the differences; and
based upon the security issues being elevated, causing a remedial action to be performed with respect to at least the identified differences in the stored sets of user information and group membership data, the remedial action comprising at least one of changing membership of the group or changing the account name of the group.

12. The computing system of claim 11, wherein the differences comprise changes in the last logon time for a dormant local user.

13. The computing system of claim 11, wherein the differences comprise changes in a bad password count for a local user.

14. The computing system of claim 11, wherein the differences comprise one or more users added to a list of local users in an admin group.

15. The computing system of claim 11, wherein the differences comprise one or more users removed from a list of local users in an admin group.

16. The computing system of claim 11, wherein the method further comprises:
periodically scanning a local user directory on a third machine using the remote admin interface protocol;
comparing two or more stored sets of user information and group membership data from the first machine and the third machine; and
identifying one or more identical sets of user information on both the first and third machines.

17. The computing system of claim 11, wherein the remote computing system periodically scans the local user directory at the local computing system without installing a monitoring agent on the local computing system.

18. The computing system of claim 11, wherein the remote admin interface protocol comprises the Security Account Manager Remote (SAMR) protocol.

19. The computing system of claim 11, wherein the remote computing system periodically scans the local user directory by submitting a query to a local database stored at the local computing system.

20. The computing system of claim 11, wherein the remedial action comprises modifying the membership of the group.

* * * * *